(12) United States Patent
Peng et al.

(10) Patent No.: US 8,135,732 B2
(45) Date of Patent: Mar. 13, 2012

(54) SYSTEM AND METHOD FOR PROVIDING NETWORK-BASED SERVICES TO USERS WITH HIGH AVAILABILITY

(75) Inventors: Hailin Peng, Beijing (CN); Zhenghua Xu, Beijing (CN); Xiaowei Yuan, Beijing (CN); Dongzhu Shi, Beijing (CN)

(73) Assignee: Computer Associates Think, Inc., Islandia, NY (US)

( * ) Notice: Subject to any disclaimer, the term of this patent is extended or adjusted under 35 U.S.C. 154(b) by 170 days.

(21) Appl. No.: 12/718,543

(22) Filed: Mar. 5, 2010

(65) Prior Publication Data

US 2011/0219019 A1    Sep. 8, 2011

(51) Int. Cl.
G06F 7/00 (2006.01)
G06F 17/30 (2006.01)
G06F 15/16 (2006.01)
(52) U.S. Cl. ......................................... 707/769; 707/764
(58) Field of Classification Search .................. 707/769, 707/770, 764
See application file for complete search history.

*Primary Examiner* — Greta Robinson
*Assistant Examiner* — Brian E. Weinrich
(74) *Attorney, Agent, or Firm* — Pillsbury Winthrop Shaw Pittman LLP

(57) ABSTRACT

A suite of network-based services, such as the services corresponding to Microsoft® SharePoint™, are provided to users with high availability. To maintain the availability of the services, the configuration parameters of a first server are updated on an ongoing basis, and the updated configuration parameters are used to configure a second, backup server. In the event of switchover or failover, the backup server is prepared to provide the serving functionality of the first server.

20 Claims, 2 Drawing Sheets

SYSTEM AND METHOD FOR PROVIDING NETWORK-BASED SERVICES TO USERS WITH HIGH AVAILABILITY

FIELD OF THE INVENTION

The invention relates to providing network-based services to users with high availability, and, in particular, to providing Microsoft® SharePoint™ services with high availability by dynamically updating configuration parameters to a back-up server.

BACKGROUND OF THE INVENTION

Microsoft® SharePoint™ may be a rich enterprise server application that provides full content management features, implement business processes, and/or provide access to information related to organizational goals and/or processes.

High availability may be a system design protocol that ensures a certain degree of operational continuity. Conventional configurations of Microsoft® SharePoint™ may be challenged to meet high availability standards for a variety of reasons. For example, queries to determined updated configuration parameters of a Microsoft® SharePoint™ server may be slow and inefficient to the point of dramatically inhibiting performance of the server.

SUMMARY

One aspect of the invention relates to providing a suite of network-based services, such as the services corresponding to Microsoft® SharePoint™, to users with high availability. The suite of network-based services may include browser-based collaboration functions, process management functions, index and search functions, document-management functions, and/or other functions.

In some implementations, the system may include a first server, a second server, and/or other components. The first server and the second server may cooperate to provide the network-based services to users via the network with high availability. As such, the first server and the second server may host the network-based services over the network to users that access the first server and the second server via client computing platforms. In order to provide the network-based services with high availability, the second server may be configured as a back-up to the first server that replaces the first server in case of failover or switchover. Failover may include situations in which the first server fails in an unexpected manner. Switchover may include situations in which the switch from the first server to the second server is performed intentionally. For example, switchover may be executed to perform maintenance on the first server, to test one or both of the first server and/or the second server, and/or for other purposes.

The first server may include electronic storage, one or more processors, and/or other components. The processor may be configured to execute a first server application module, a compiler module, a runtime module, a query module, and/or other modules.

The first server application module may be configured to provide a first instance of a server application. As used herein, the term "server application" may refer to one or more software elements that cooperate in an integrated manner to provide the network-based services associated with the first server to users. For example, the first server application module may include the collection of software elements available from Microsoft® Sharepoint™ 2010, and/or Microsoft® SharePoint™ 2007. The first server application module may be configured such that the server application provides application programming interfaces through which the first server application module communicates with other computer program modules that are not an integral part of the first server application module. By way of non-limiting example, the cooperative software elements of the first instance of the server application provided by the first server application module may include one or more of a web server sub-module, a database server sub-module, an application server sub-module, and/or other sub-modules.

The compiler module may be configured to compile programming code defining other computer program modules. The compiler module may compile the programming code defining other computer program modules that are configured to communicate with the first server application module via the application programming interfaces. Compiling the programming code may include converting the programming code from a human decipherable programming language (e.g., C+, C++, C#, other .NET languages, and/or other programming code languages) into an intermediate language. By way of non-limiting example, the intermediate language may include Common Intermediate Language, and/or other assembly languages.

The runtime module may be configured to convert programming code from the intermediate language into native code (e.g., bytecode) that is executable directly by the processor in conjunction with the first server application module. As referred to herein, "native code" is numeric machine code that is executable by electronic processors, such as the processor, but that is not readable for practical purposes by humans. The runtime module may be configured to perform this conversion right at, or near to, the time when the converted code will be executed on the processor. This includes the conversion of intermediate language code corresponding to other computer program modules that are communicating with the first server application module via the application programming interfaces, and that have been compiled by the compiler module.

During typical implementation, a computer program module external to the first server application module may be configured to communicate with the first instance of the server application corresponding to the first server application module via the application programming interfaces. In preparation for runtime time, the compiler module may be configured to compile the external computer program module from its human-readable computer language to the intermediate language. At runtime, the runtime module may be configured to convert the intermediate language associated with the external computer program module to native code that can be executed on the processor at runtime. The execution of the native code on the processor at runtime provide the functionality associated with the external computer program module, and may result in the desired communication between the external computer program module and the first instance of the server application associated with the first server application module.

Typically, none of the intermediate language code or the native code associated with the external computer program module may be maintained in memory. Thus, generally for an external computer program module to communicate and/or interact with the first server application module again, the external computer program module must be re-compiled and re-converted all over.

During operation of the first instance of the server application associated with the first server application module, various configuration parameters of the server application may be changed. Such changes may be automatic and dynamic based on use of the first instance of the server application and/or made manually by users/administrators of the system. If the configuration of the second server is not synchronized with the current configuration parameters of the first server application module on the first server, switching serving functionality from the first server to the second server during failover/switchover may not be successful.

For example, the configuration parameters of the server application that are changed may include one or more configuration parameters of the web server associated with the server application, one or more configuration parameters of the database server associated with the server application, and/or one or more configuration parameters of the application server. The one or more configuration parameters of the web server may include one or more of web sites hosted/supported, website configuration parameters (e.g., security parameters, users that can access a given web site, and/or other website configuration parameters), and/or other parameters. The one or more configuration parameters of the database server may include back-up parameters that configure snapshots and/or backup copying of the database server, security parameters, database instance type, maximum number of log volumes, and/or other parameters. The one or more configuration parameters of the application server may include one or more of one or more of server roles (e.g., index role, query role, excel role, and/or other server roles) started/configured on a given server, the settings of individual server roles (e.g., the scheduler or contents of indexing, the locations where indexed files are located, and/or other server role settings), and/or other parameters.

The query module may be configured to determine the current configuration parameters of the first server application module, and to provide the current configuration parameters to the second server so that the second server can be synchronized with the first server. To accomplish this, the query module may be configured to generate queries to the application programming interfaces of the first server application module requesting the configuration parameters of the first server application module. The queries may be generated with a periodicity, based on detection of trigger events, and/or otherwise timed or initiated. The timing of the queries (e.g., the periodicity) may be configurable by a user of the system (e.g., an administrator of the system). The query module may be configured to receive responses to the queries from the first server application module. The first server application module may be configured to transmit information related to the received responses to the second server. Such information may be transmitted between the first server and the second server, for example, by way of the network, via a dedicated and direct communication link, and/or by other electronic communication link.

In some implementations, the query module may be configured to transmit information related to each received response to the second server. In some implementations, the query module may be configured such that information related to a response is only transmitted to the second server if one or more configuration parameters have changed since the last query. In such implementations, the query module may be configured to compare the configuration represented in a response with the previous configuration, and may transmit information related to the response to the second server only if the configuration has changed. If the configuration has changed and information related to the response is sent, the query module may be configured to store the new configuration for comparison to subsequent responses.

In some implementations, the query module runs as a background process on the processor. This may mean that the query module may run with limited priority and use relatively little resources. For example, the query module may be registered as a Windows service. The service may be initiated automatically at startup of the first server. To reduce the amount of resources required by the query module, the query module may be implemented such that upon execution of the query module on the processor, the native code associated with the query module that is generated by the runtime module (after compilation of the query module by the compiler module) may be held for reuse. This may enhance performance of the query module, since the query module can be executed to generate queries to the first server application module without having to re-compiled and/or re-converted by the compiler module and/or the runtime module, respectively.

In some implementations, reusing the native code associated with the query module may significantly impact the amount of processing resources and/or time required for the query module to obtain the current configuration parameters of the first server application module. This difference in resources and/or cycle time may make maintaining current configuration parameters on the second server feasible, as the query module may be too slow to implement if compilation and/or conversion were to be required at each cycle.

Certain changes in the configuration of the first server application module may obsolete previously cached native code associated with the query module. If the obsolete native code is still used, unexpected (and inaccurate) results may occur. For example, if the first server application module is incorporated into a new server farm, calls for configuration parameters may not be directed to the proper locations. As such, the query module may be configured to detect a change in server farm identifier, and to release previously cached code responsive to a change. Upon releasing the cached code, the query module may be reinitialized (by the compiler module and the runtime module) with updated information corresponding to the new server farm identifier.

The second server may include electronic storage, one or more processors, and/or other components. The processor of the second server may be configured to execute one or more of a second server application module, a synchronization module, and/or other modules.

The second server application module may be configured to provide a second instance of the server application. For example, the second server application module may include the collection of software elements available from Microsoft® SharePoint™ 2010, and/or Microsoft® SharePoint™ 2007. Similar to the first server application module, the second server application module may be configured such that the second instance of the server application provides application programming interfaces through which the second server application module communicates with other computer program modules that are not an integral part of the second server application module.

The cooperative software elements of second instance of the server application provided by the second server application module may correspond to the cooperative software elements of the first instance of the server application provided by the first server application module. As such, the second server application module may include one or more of a web server sub-module, a database server sub-module, an application server sub-module, and/or other sub-modules that correspond to the sub-modules associated with the first server application module executed on the first server.

The synchronization module may be configured to update the configuration parameters of the second server application module based on the information received from the first server related to the configuration parameters of the first server application module. This may include receiving information transmitted to the second server by the query module, and generating commands to the second server application module, via the corresponding application programming interfaces, that cause the configuration parameters of the second server application module correspond to the current configuration parameters of the first server application module. By virtue of this synchronization, if the serving of content and/or functionality is switched from the first server to the second server by virtue of failover or switchover, the second server will already have the appropriate configuration parameters to accommodate the switch.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
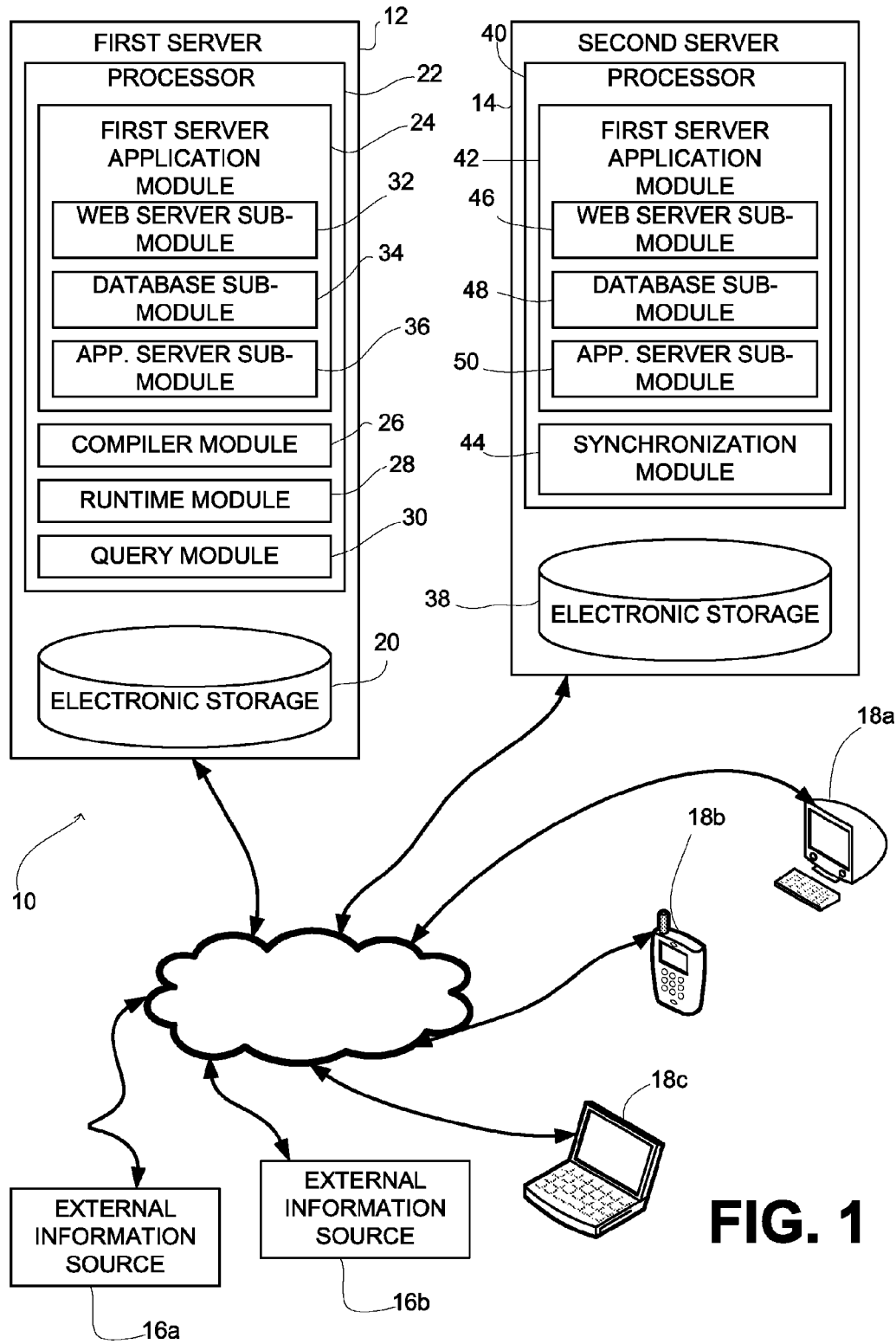
FIG. 1 illustrates a system configured to provide a suite of network-based services to users with high availability, according to one or more embodiments of the invention.

FIG. 1 illustrates a system 10 configured to provide a suite of network-based services to users with high availability. The suite of network-based services may include browser-based collaboration functions, process management functions, index and search functions, document-management functions, and/or other functions. The suite of network-based services may correspond to services provided by, for example, Microsoft® SharePoint™ software elements being executed on one or more processors. As used herein, the term "high availability" may refer a system design protocol that ensures a certain degree of operational continuity during a given measurement period. In some implementations, system 10 may include a first server 12, a second server 14, and/or other components.

The system 10 may leverage one or more external information sources 16. Users may interface with system 10 and/or external information sources 16 via client computing platforms 18a, 18b, and/or 18c. The components of system 10, external information sources 16a and/or 16b, and/or client computing platforms 18a, 18b, and/or 18c may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which system 10, external information sources 16a and/or 16b, and/or client computing platforms 18a, 18b, and/or 18c are operatively linked via some other communication media.

A given client computing platform 18a may include one or more processors configured to execute computer program modules. The computer program modules may be configured to enable one or more users associated with the given client computing platform 18a to interface with system 10 and/or external information sources 16a and/or 16b, and/or provide other functionality attributed herein to the give client computing platform platform 18a. By way of non-limiting example, the given client computing platform 18a may include one or more of a desktop computer, a laptop computer, a handheld computer, a NetBook, a Smartphone, and/or other computing platforms.

The external information sources 16a and/or 16b may be configured to provide information to system 10. This information may include content, user information, information related to achievements or accomplishments of users, and/or other information.

As is described further below, first server 12 and second server 14 may cooperate to provide the network-based services to users of client computing platforms 18a, 18b, and/or 18c via the network. As such, first server 12 and second server 14 may host the network-based services over the network to client computing platforms 18a, 18b, and/or 18c. In order to provide the network-based services with high availability, second server 14 may be configured as a back-up to first server 12 that replaces first server 12 in case of failover or switchover. Failover may include situations in which first server 12 fails in an unexpected manner. Switchover may include situations in which the switch from first server 12 to second server 14 is performed intentionally. For example, switchover may be executed to perform maintenance on first server 12, to test one or both of first server 12 and/or second server 14, and/or for other purposes.

The first server 12 may include electronic storage 20, one or more processors 22, and/or other components. Electronic storage 20 may comprise electronic storage media that electronically stores information. The electronic storage media of electronic storage 20 may include one or both of system storage that is provided integrally (i.e., substantially non-removable) with first server 12 and/or removable storage that is removably connectable to first server 12 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may store software algorithms, information determined by processor 22, information received via the network, and/or other information that enables first server 12 to function properly. Electronic storage 20 may be a separate component within first server 12, or electronic storage 20 may be provided integrally with one or more other components of first server 12 (e.g., processor 22).

Processor 22 may be configured to provide information processing capabilities in first server 12. As such, processor 22 may include one or more of a digital processor, an analog processor, a digital circuit designed to process information, an analog circuit designed to process information, a state machine, and/or other mechanisms for electronically processing information. Although processor 22 is shown in FIG. 1 as a single entity, this is for illustrative purposes only. In some implementations, processor 22 may include a plurality of processing units. These processing units may be physically located within the same device, or processor 22 may represent processing functionality of a plurality of devices operating in coordination.

As is shown in FIG. 1, processor 22 may be configured to execute one or more computer program modules. The one or more computer program modules may include one or more of a first server application module 24, a compiler module 26, a runtime module 28, a query module 30, and/or other modules. Processor 22 may be configured to execute modules 24, 26, 28, and/or 30 by software; hardware; firmware; some combination of software, hardware, and/or firmware; and/or other mechanisms for configuring processing capabilities on processor 22.

It should be appreciated that although modules 24, 26, 28, and/or 30 are illustrated in FIG. 1 as being co-located within a single processing unit, in implementations in which processor 22 includes multiple processing units, one or more of modules 24, 26, 28, and/or 30 may be located remotely from the other modules. The description of the functionality provided by the different modules 24, 26, 28, and/or 30 described below is for illustrative purposes, and is not intended to be limiting, as any of modules 24, 26, 28, and/or 30 may provide more or less functionality than is described. For example, one or more of modules 24, 26, 28, and/or 30 may be eliminated, and some or all of its functionality may be provided by other ones of modules 24, 26, 28, and/or 30. As another example, processor 22 may be configured to execute one or more additional modules that may perform some or all of the functionality attributed below to one of modules 24, 26, 28, and/or 30.

The first server application module 24 may be configured to provide a first instance of a server application. As used herein, the term "server application" may refer to one or more software elements that cooperate in an integrated manner to provide the network-based services associated with first server 12 to users. For example, the first server application module 24 may include the collection of software elements available from Microsoft® SharePoint™ 2010, or Microsoft® SharePoint™ 2007. The first server application module 24 may be configured such that the server application provides application programming interfaces through which first server application module 24 communicates with other computer program modules that are not an integral part of first server application module 24.

By way of non-limiting example, the cooperative software elements of the first instance of the server application provided by first server application module 24 may include a plurality of sub-modules that may be implemented in to provide the network-based services in an integrated and cohesive manner. The sub-modules may include one or more of a web server sub-module 32, a database server sub-module 34, an application server sub-module 36, and/or other sub-modules. It will be appreciated that in implementations in which first server 12 is implemented in a plurality of devices, various ones of sub-modules 32, 34, and/or 36 may be implemented in different devices.

The web server sub-module 32 may be configured to perform the functionality of a front-end web server in serving content over the network via a network communication protocol (e.g., HTTP and/or other protocols). The content may include webpages. A webpage may include a document or resource that is accessible via a browser. These documents may be formatted in a mark-up format (e.g., HTML, XHTML, XML, and/or other mark-up formats). Serving the content may include receiving requests for content, receiving instructions for altering or calling content, and/or receiving other requests or instructions from client computing platform(s) 18*a* 18*b*, and/or 18*c*, and then responding by providing the requested content (or locations of the requested content) to the requesting client computing platform(s) 18*a*, 18*b*, and/or 18*c*.

The database server sub-module 34 may be configured to provide database services to users of client computing platforms 18*a*, 18*b*, and/or 18*c* via the network. This may include receiving database commands, queries, content, and/or other information related to a database, performing the requested actions and/or obtaining the requested information, and providing the results to the requesting client computing platform(s) 18*a*, 18*b*, and/or 18*c*.

The application server sub-module 36 may be configured to provide application server functionality to client computing platforms 18*a*, 18*b*, and/or 18*c*. This may include executing a plurality of different information processing tasks at the request of client computing platforms 18*a*, 18*b*, and/or 18*c*, and then returning the results to client computing platforms 18*a*, 18*b*, and/or 18*c*. For example, application server sub-module 36 may be configured to index content served by first server application module 24, may be configured to search for content served by first server application module 24, may be configured to perform calculations at the request of client computing platforms 18*a*, 18*b*, and/or 18*c*, and/or may be provided to host other application functions.

The compiler module 26 may be configured to compile programming code defining other computer program modules. The compiler module 26 may compile the programming code defining other computer program modules that are configured to communicate with first server application module 24 via the application programming interfaces. Compiling the programming code may include converting the programming code from a human decipherable programming language (e.g., C+, C++, C#, other .NET languages, and/or other programming code languages) into an intermediate language. By way of non-limiting example, the intermediate language may include Common Intermediate Language, and/or other assembly languages.

The runtime module 28 may be configured to convert programming code from the intermediate language into native code (e.g., bytecode) that is executable directly by processor 22 in conjunction with first server application module 24. As referred to herein, "native code" is numeric machine code that is executable by electronic processors, such as processor 22, but that is not readable for practical purposes by humans. The runtime module 28 may be configured to perform this conversion right at, or near to, the time when the converted code will be executed on processor 22. This includes the conversion of intermediate language code corresponding to other computer program modules that are communicating with first server application module 24 via the application programming interfaces, and that have been compiled by compiler module 26.

During typical implementation, a computer program module external to first server application module 24 may be configured to communicate with the first instance of the server application corresponding to first server application module 24 via the application programming interfaces. In preparation for runtime time, compiler module 26 may be configured to compile the external computer program module from its human-readable computer language to the intermediate language. At runtime, runtime module 28 may be configured to convert the intermediate language associated with the external computer program module to native code that can be executed on processor 22 at runtime. The execution of the native code on processor 22 at runtime provide the functionality associated with the external computer program module, and may result in the desired communication between the external computer program module and the first instance of the server application associated with first server application module 24.

Typically, none of the intermediate language code or the native code associated with the external computer program module may be maintained in memory. Thus, generally for an external computer program module to communicate and/or interact with first server application module 24 again, the external computer program module must be re-compiled and re-converted all over.

During operation of the first instance of the server application associated with first server application module 24, various configuration parameters of the server application may be changed. Such changes may be automatic and dynamic based on use of the first instance of the server application and/or made manually by users/administrators of system 10. If the configuration of second server 14 is not synchronized with the current configuration parameters of first server application module 24 on first server 12, switching serving functionality from first server 12 to second server 14 during failover/switchover may not be successful.

For example, the configuration parameters of the server application that are changed may include one or more configuration parameters of the web server associated with the server application, one or more configuration parameters of the database server associated with the server application, and/or one or more configuration parameters of the application server. The one or more configuration parameters of the web server may include one or more of web sites hosted/supported, website configuration parameters (e.g., security parameters, users that can access a given web site, and/or other website configuration parameters), and/or other parameters. The one or more configuration parameters of the database server may include back-up parameters that configure snapshots and/or backup copying of the database server, security parameters, database instance type, maximum number of log volumes, and/or other parameters. The one or more configuration parameters of the application server may include one or more of one or more of server roles (e.g., index role, query role, excel role, and/or other server roles) started/configured on a given server, the settings of individual server roles (e.g., the scheduler or contents of indexing, the locations where indexed files are located, and/or other server role settings), and/or other parameters.

The query module 30 may be configured to determine the current configuration parameters of first server application module 24, and to provide the current configuration parameters to second server 14 so that second server 14 can be synchronized with first server 12. To accomplish this, query module 30 may be configured to generate queries to the application programming interfaces of first server application module 24 requesting the configuration parameters of first server application module 24. The queries may be generated with a periodicity, based on detection of trigger events, and/or otherwise timed or initiated. The timing of the queries (e.g., the periodicity) may be configurable by a user of system 10 (e.g., an administrator of system 10). The query module 30 may be configured to receive responses to the queries from first server application module 24. The first server application module 24 may be configured to transmit information related to the received responses to second server 14. Such information may be transmitted between first server 12 and second server 14, for example, by way of the network, via a dedicated and direct communication link, and/or by other electronic communication link.

In some implementations, query module 30 may be configured to transmit information related to each received response to second server 14. In some implementations, query module 30 may be configured such that information related to a response is only transmitted to second server 14 if one or more configuration parameters have changed since the last query. In such implementations, query module 30 may be configured to compare the configuration represented in a response with the previous configuration, and may transmit information related to the response to second server 14 only if the configuration has changed. If the configuration has changed and information related to the response is sent, query module 30 may be configured to store the new configuration for comparison to subsequent responses.

In some implementations, query module 30 runs as a background process on processor 22. This may mean that query module 30 may run with limited priority and use relatively little resources. For example, query module 30 may be registered as a Windows service. The service may be initiated automatically at startup of first server 12. To reduce the amount of resources required by query module 30, query module 30 may be implemented such that upon execution of query module 30 on processor 22, the native code associated with query module 30 that is generated by runtime module 28 (after compilation of query module 30 by compiler module 26) may be held for reuse. This may enhance performance of query module 30, since query module 30 can be executed to generate queries to first server application module 24 without having to re-compiled and/or re-converted by compiler module 26 and/or runtime module 28, respectively.

In some implementations, reusing the native code associated with query module 30 may significantly impact the amount of time required for query module 30 to obtain the current configuration parameters of first server application module 24. This difference in cycle time may make maintaining current configuration parameters on second server 14 feasible, as query module 30 may be too slow to implement if compilation and/or conversion were to be required at each cycle.

Certain changes in the configuration of first server application module 24 may obsolete previously cached native code associated with query module 30. If the obsolete native code is still used, unexpected (and inaccurate) results may occur. For example, if first server application module 24 is incorporated into a new server farm, calls for configuration parameters may not be directed to the proper locations. As such, query module 30 may be configured to detect a change in server farm identifier, and to release previously cached code responsive to a change. Upon releasing the cached code, query module 30 may be reinitialized (by compiler module 26 and runtime module 28) with updated information corresponding to the new server farm identifier.

The second server 14 may include electronic storage 38, one or more processors 40, and/or other components. Electronic storage 38 may comprise electronic storage media that electronically stores information. The electronic storage media of electronic storage 38 may include one or both of system storage that is provided integrally (i.e., substantially non-removable) with second server 14 and/or removable storage that is removably connectable to second server 14 via, for example, a port (e.g., a USB port, a firewire port, etc.) or a drive (e.g., a disk drive, etc.). Electronic storage 38 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 38 may store software algorithms, information determined by processor 40, information received via the network, and/or other information that enables second server 14 to function properly. Electronic storage 38 may be a separate component within second server 14, or electronic storage 38 may be provided integrally with one or more other components of second server 14 (e.g., processor 40).

Processor 40 may be configured to provide information processing capabilities in second server 14. As such, processor 40 may include one or more of a digital processor, an analog processor, a digital circuit designed to process information, an analog circuit designed to process information, a state machine, and/or other mechanisms for electronically processing information. Although processor 40 is shown in FIG. 1 as a single entity, this is for illustrative purposes only. In some implementations, processor 40 may include a plurality of processing units. These processing units may be physically located within the same device, or processor 40 may represent processing functionality of a plurality of devices operating in coordination.

As is shown in FIG. 1, processor 40 may be configured to execute one or more computer program modules. The one or more computer program modules may include one or more of a second server application module 42, a synchronization module 44, and/or other modules. Processor 40 may be configured to execute modules 42 and/or 44 by software; hardware; firmware; some combination of software, hardware, and/or firmware; and/or other mechanisms for configuring processing capabilities on processor 22.

It should be appreciated that although modules 42 and/or 44 are illustrated in FIG. 1 as being co-located within a single processing unit, in implementations in which processor 40 includes multiple processing units, one or more of modules 42 and/or 44 may be located remotely from the other modules. The description of the functionality provided by the different modules 42 and/or 44 described below is for illustrative purposes, and is not intended to be limiting, as any of modules 42 and/or 44 may provide more or less functionality than is described. For example, one or more of modules 42 and/or 44 may be eliminated, and some or all of its functionality may be provided by other ones of modules 42 and/or 44. As another example, processor 40 may be configured to execute one or more additional modules that may perform some or all of the functionality attributed below to one of modules 42 and/or 44.

The second server application module 42 may be configured to provide a second instance of the server application. For example, the second server application module 42 may include the collection of software elements available from Microsoft® SharePoint™ 2010, and/or Microsoft® SharePoint™ 2007. Similar to first server application module 24, second server application module 42 may be configured such that the second instance of the server application provides application programming interfaces through which second server application module 42 communicates with other computer program modules that are not an integral part of second server application module 42.

The cooperative software elements of second instance of the server application provided by second server application module 42 may correspond to the cooperative software elements of the second instance of the server application provided by first server application module 24. As such, second server application module 42 may include one or more of a web server sub-module 46, a database server sub-module 48, an application server sub-module 50, and/or other sub-modules. The functionality of web server sub-module 46, database server sub-module 48, and application server sub-module 50 may correspond to the functionality of web server sub-module 32, database server sub-module 34, and application server sub-module 36, respectively, described above.

The synchronization module 44 may be configured to update the configuration parameters of second server application module 42 based on the information received from first server 12 related to the configuration parameters of first server application module 24. This may include receiving information transmitted to second server 14 by query module 30, and generating commands to second server application module 42, via the corresponding application programming interfaces, that cause the configuration parameters of second server application module 42 correspond to the current configuration parameters of first server application module 24. By virtue of this synchronization, if the serving of content and/or functionality is switched from first server 12 to second server 14 by virtue of failover or switchover, second server 14 will already have the appropriate configuration parameters to accommodate the switch.

Figure 2:
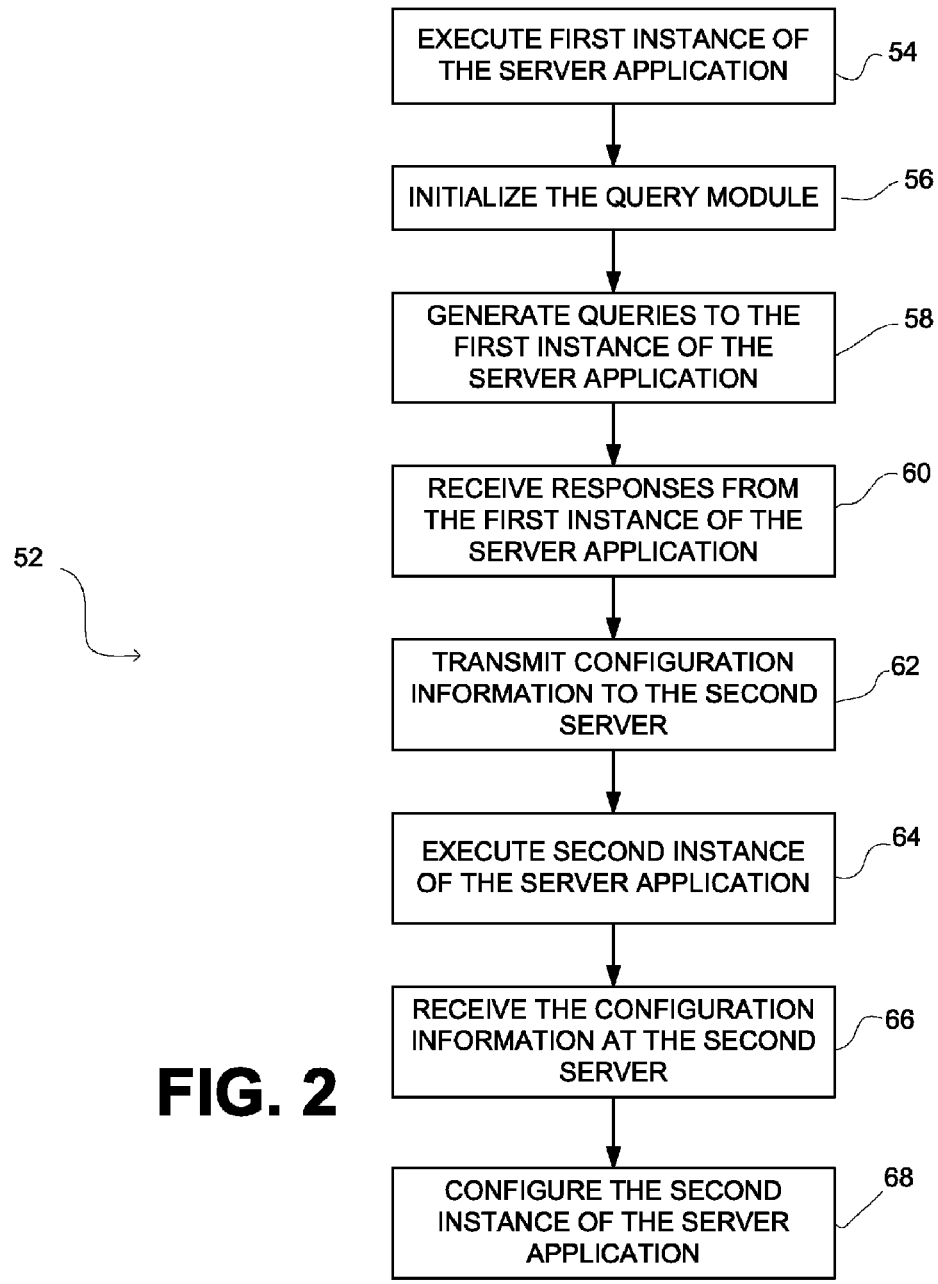
FIG. 2 illustrates a method of providing a server application with high availability, in accordance with one or more embodiments of the invention.

FIG. 2 illustrates a method 52 of providing a server application with high availability. The operations of method 52 presented below are intended to be illustrative. In some embodiments, method 52 may be accomplished with one or more additional operations not described, and/or without one or more of the operations discussed. Additionally, the order in which the operations of method 52 are illustrated in FIG. 2 and described below is not intended to be limiting.

In some embodiments, method 52 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 52 in response to instructions stored electronically on an electronic storage medium. The one or more processing devices may include one or more devices configured through hardware, firmware, and/or software to be specifically designed for execution of one or more of the operations of method 52.

At an operation 54, a first instance of a server application may be executed on a first server. The first instance of the server application may provide a first web server, a first application server, and/or a first database server. The first instance of the server application may facilitate access and interaction of functionality served by the first server to users. The first instance of the server application may include application programming interfaces through which the first instance of the server application communicates with one or more computer program modules that are unassociated with the first instance of the server application. In some implementations, operation 54 may be performed by a first server application module similar to or the same as first server application module 24 (shown in FIG. 1 and described above).

At an operation 56, a query module may be initialized. Initializing the query module may include compiling programming code defining the query module into intermediate language code, and/or converting the intermediate language code into native code that is directly executable by a processor. The query module may be configured to communicate with the first instance of the server application through the application programming interfaces. Operation 56 may be performed responsive to startup of the first server. The query module may be configured to run on the first server in the background. In some implementations, operation 56 may be performed by a compiler module and/or a runtime module similar to or the same as compiler module 26 and/or runtime module 28, respectively (shown in FIG. 1 and described above).

At an operation 58, queries to the application programming interfaces may be generated. The queries may request configuration parameters of the first instance of the server application. These configuration parameters may include configuration parameters of the first web server, configuration parameters of the first database server, configuration parameters of the first application server, and/or other configuration parameters. In some implementations, operation 58 may be performed by the query module. The query module may be similar to or the same as query module 30 (shown in FIG. 1 and described above).

At an operation 60, responses to the queries may be received from the application programming interfaces. In some implementations, operation 60 may be performed by the query module that similar to or the same as query module 30 (shown in FIG. 1 and described above).

At an operation 62, information related to the received responses may be transmitted to a second server. In some implementations, operation 62 may be performed by the query module similar to or the same as query module 30 (shown in FIG. 1 and described above).

At an operation 64, a second instance of the server application may be executed on the second server. The second instance of the server application may provide a second web server, a second database server, and/or a second application server. In some implementations, operation 64 may be performed by a second server application module similar to or the same as second server application module 42 (shown in FIG. 1 and described above).

At an operation 66, the information transmitted at operation 62 is received at the second server.

At an operation 68, responsive to the receipt of information at operation 66, commands may be generated that cause the configuration parameters of the second instance of the server application to correspond to the configuration parameters of the first instance of the server application. The commands may be provided to the second instance of the server application at application programming interfaces provided by the second instance of the server application. The commands may cause the configuration parameters of the second web server, the second database server, and/or the second application server to correspond to the configuration parameters of the first web server, the first database server, and/or the first application server, respectively. In some implementations, operation 68 may be performed by a synchronization module similar to or the same as synchronization module 44 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a server application with high availability, the system comprising:
a first server; and
a second server,
wherein the first server comprises one or more processors configured to execute a first set of computer program modules, the first set of computer program modules comprising:
a first server application module configured to facilitate access and interaction of users with content and functionality served by the first server application module, wherein the first server application module provides at least a first web server, a first application server, and a first database server, and wherein the first server application module provides application programming interfaces through which the first server application module communicates with other computer program modules included in the first set of computer program modules; and
a query module configured (i) to generate queries to the application programming interfaces of the first server application module requesting configuration parameters of the first web server, the first application server, and the first database server, (ii) to receive responses to the queries from the application programming interfaces of the first server application module, and (iii) to transmit information related to the received responses to the second server; and
wherein the second server comprises one or more processors configured to execute a second set of computer program modules, wherein the second set of computer program modules comprises:
a second server application module configured to facilitate access and interaction of users with content and functionality served by the second server application module, wherein the second server application module provides at least a second web server, a second application server, and a second database server, and wherein the second server application module provides application programming interfaces through which the second server application module communicates with other computer program modules in the second set of computer program modules; and
a synchronization module configured (i) to receive the information transmitted to the second server by the query module, and (ii) to generate commands to the second server application module, via the application programming interfaces of the second server application module, that cause the configuration parameters of the second server application module to correspond to the configuration parameters of the first server application module.

2. The system of claim 1, wherein the query module is configured to run in the background on the first server.

3. The system of claim 2, wherein the query module is configured to register as a service that is initiated at startup of the first server, and to run in the background as execution of the first server application module is ongoing.

4. The system of claim 1, wherein the first set of computer program modules further comprise:
a compiler module configured to compile programming code defining other computer program modules configured to communicate with the server application module via the application programming interfaces, wherein the compiler module is configured to compile the other computer program modules by converting the other computer program modules into an intermediate language; and
a runtime module configured to convert the other computer program modules from the intermediate language into native code that is executable by the one or more processors of the first server, and to provide the native code for execution on the one or more processors; and wherein the query module is configured such that between queries to the application programming interfaces of the first server application module, the intermediate language associated with the query module is held by the runtime module and reused at the next query without the compiler module re-compiling the query module.

5. The system of claim 1, wherein the query module is configured to generate queries to the application programming interfaces of the first server application module with a periodicity.

6. The system of claim 5, wherein the periodicity is configurable by a user.

7. The system of claim 1, wherein the second server application module is configured to take the place of the first server application module to serve content and functionality served by the first server application module during a switchover or during a failover.

8. The system of claim 1, wherein the first server application module and the second application module are provided by Microsoft® Sharepoint™.

9. A method of providing a server application with high availability, wherein the method is implemented in a computer system comprising a first server and a second server, wherein the first server comprises one or more processors configured to execute a first set of computer program modules, and wherein the second server comprises one or more processors configured to execute a second set of computer program modules, the method comprising:
(a) executing, on the first server, a first instance of a server application that provides a first web server, a first application server, and a first database server, in order to facilitate access and interaction of users with content and functionality served by the first server, wherein the first instance of the server application includes application programming interfaces through which the first instance of the server application communicates with one or more computer program modules that are unassociated with the first instance of the server application;
(b) generating, on the first server, queries to the application programming interfaces requesting configuration parameters of the first web server, the first application server, and the first database server;
(c) receiving, on the first server, responses to the queries from the application programming interfaces;
(d) transmitting information related to the received responses from the first server to the second server;
(e) executing, on the second server, a second instance of the server application that provides a second web server, a second application server, and a second database server, in order to facilitate access and interaction of users with content and functionality served by the second server;
(f) receiving, at the second server, the information transmitted to the second server from the first server; and
(g) responsive to the information received from the first server, generating, on the second server, commands to the second instance of the server application, that cause the configuration parameters of the second web server, the second application server, and the second database server to correspond to the configuration parameters of the first web server, the first application server, and the first database server, respectively.

10. The method of claim 9, wherein the computer program modules executed on the one or more processors of the first server are further configured such that operations (b), (c), and (d) run in the background on the first server.

11. The method of claim 10, wherein the computer program modules executed on the one or more processors of the first server are further configured such that operations (b), (c), and (d) are registered as a service that is initiated at startup of the first server, and run in the background as execution of the first instance of the server application is ongoing.

12. The method of claim 9, further comprising:
compiling, on the first server, programming code defining other computer program modules configured to communicate with the first instance of the server application via the application programming interfaces, wherein compiling such computer program modules includes converting such computer program modules into an intermediate language;
converting the compiled computer program modules from intermediate language code into native code that is executable by the one or more processors of the first server; and
providing the native code for execution on the one or more processors of the first server; and
wherein the computer program modules executed on the one or more processors of the first server are further configured such that between queries generated by operation (b), the intermediate language code associated with the one or more computer program modules configured to perform operation (b) is held and reused at the next query without re-compiling such one or more computer program modules.

13. The method of claim 9, wherein the queries generated by operation (b) are generated with a periodicity.

14. The method of claim 13, wherein the periodicity is configurable by a user.

15. The method of claim 9, further comprising replacing the first instance of the server application with the second instance of the server application during a switchover or during a failover.

16. The method of claim 9, wherein the server application is provided by Microsoft® Sharepoint™.

17. A method of providing a server application with high availability, wherein the method is implemented in a computer system comprising a first server and a second server, wherein the first server comprises one or more processors configured to execute a first set of computer program modules, and wherein the second server comprises one or more processors configured to execute a second set of computer program modules, the method comprising:
initializing, on the first server, a query module, wherein initializing the query module comprises:
compiling, on the first server, programming code defining the query module by converting such programming code into an intermediate language; and
converting the intermediate language programming code associated with the query module from the intermediate language into native code that is executable by the one or more processors of the first server;
executing, on the first server, a first instance of a server application that provides a first web server, a first application server, and a first database server, in order to facilitate access and interaction of users with content and functionality served by the first server, wherein the first instance of the server application includes application programming interfaces through which the first instance of the server application communicates with one or more computer program modules that are unassociated with the first instance of the server application;
executing the query module on the first server to (i) generate, on the first server, queries to the application programming interfaces requesting configuration parameters of the first web server, the first application server, and the first database server, (ii) receive, on the first server, responses to the queries from the application programming interfaces, and (iii) transmit information related to the received responses from the first server to the second server, wherein execution of the query module is accomplished using the previously generated intermediate language code without re-compiling the query module between queries.

18. The method of claim 17, wherein the query module is initialized automatically responsive to startup of the first server.

19. The method of claim 17, wherein executing the query module on the first server comprises executing the query module in the background.

20. The method of claim 17, wherein the server application is provided by Microsoft® Sharepoint™.

* * * * *